US008730222B2

(12) United States Patent
Chang et al.

(10) Patent No.: US 8,730,222 B2
(45) Date of Patent: May 20, 2014

(54) DISPLAY CAPABLE OF IMPROVING FRAME QUALITY AND METHOD THEREOF

(75) Inventors: Chih-Wei Chang, Taoyuan County (TW); Shu-Wen Chang, Taoyuan County (TW); Chien-Yang Chen, Taipei (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 262 days.

(21) Appl. No.: 13/342,211

(22) Filed: Jan. 3, 2012

(65) Prior Publication Data

US 2013/0113769 A1 May 9, 2013

(30) Foreign Application Priority Data

Nov. 7, 2011 (TW) ............................. 100140596 A

(51) Int. Cl.
*G06F 3/038* (2013.01)
*G09G 5/00* (2006.01)

(52) U.S. Cl.
USPC ............................................. 345/209; 345/87

(58) Field of Classification Search
USPC ............ 345/89–101, 204–214; 348/500, 522, 348/526, 533, 535, 545
See application file for complete search history.

(56) References Cited

U.S. PATENT DOCUMENTS

| | | | | |
|---|---|---|---|---|
| 6,853,362 | B2 * | 2/2005 | Bu | 345/96 |
| 2005/0219188 | A1 * | 10/2005 | Kawabe et al. | 345/94 |
| 2007/0046614 | A1 | 3/2007 | Chien | |
| 2008/0170017 | A1 * | 7/2008 | Jeoung et al. | 345/87 |
| 2008/0238854 | A1 * | 10/2008 | Kimura | 345/98 |
| 2010/0238204 | A1 * | 9/2010 | Chen et al. | 345/690 |
| 2011/0058024 | A1 * | 3/2011 | Choi et al. | 348/51 |

FOREIGN PATENT DOCUMENTS

CN 101661714 B 2/2012

* cited by examiner

*Primary Examiner* — William Boddie
*Assistant Examiner* — Amy C Onyekaba
(74) *Attorney, Agent, or Firm* — Winston Hsu; Scott Margo

(57) ABSTRACT

A display capable of improving frame quality includes a display panel, a timing controller, and a source driver. The timing controller is used for generating a scan start signal, and generating at least one control signal in a blanking time of the display panel according to polarity of a last datum before the blanking time and polarity of a first datum after the blanking time. The source driver is used for generating at least one datum synchronized with the at least one control signal according to the polarity of the last datum before the blanking time, a voltage of the first datum after the blanking time and the at least one control signal. The source driver does not change a last datum of the at least one datum after the at least one control signal in the blanking time.

14 Claims, 10 Drawing Sheets

DISPLAY CAPABLE OF IMPROVING FRAME QUALITY AND METHOD THEREOF

BACKGROUND OF THE INVENTION

1. Field of the Invention

The present invention is related to a display and method thereof, and particularly to a display capable of improving frame quality and method thereof.

2. Description of the Prior Art

Please refer to FIG. 1 and FIG. 2. FIG. 1 is a timing diagram illustrating an active time VA and a blanking time VB of a display panel, a scan start signal STV, data outputted by a source driver, control signals CS outputted by a timing controller, and a common voltage VCOM of the display panel according to the prior art, and FIG. 2 is a diagram illustrating a bright band being shown in an upper side of the display panel when the display panel refreshes data of a frame according to the prior art. As shown in FIG. 1, the timing controller of the display panel still outputs the control signals CS continuously in the blanking time VB. Therefore, the timing controller can control the source driver to output a last datum of a frame Fn continuously or output a constant value (such as a voltage corresponding to black (+) or a voltage corresponding to black (−)) continuously according to the control signals CS in the blanking time VB.

As shown in FIG. 1, in the active time VA of the frame Fn, the source driver outputs data (a voltage corresponding to 128 (−) and the voltage corresponding to the black (+) in turn), where a last datum DL outputted by the source driver is the voltage corresponding to the black (+). Therefore, in the blanking time VB, the timing controller can control the source driver to output the voltage corresponding to the black (−) and the voltage corresponding to the black (+) in turn. As shown in FIG. 1, in a frame Fn+1 of the active time VA, a first datum DF outputted by the source driver is the voltage corresponding to the black (−), and a last datum DLB outputted by the source driver is the voltage corresponding to the black (+) in the blanking time VB. That is to say, a voltage of a datum outputted by the source driver corresponding to a first scan line of the frame Fn+1 is changed from the voltage corresponding to the black (+) to the voltage corresponding to the black (−) (that is, a voltage drop 13V), so the common voltage VCOM of the display panel is coupled down (a point A in FIG. 1). Therefore, as shown in FIG. 2, when the display panel refreshes data of a frame (from the frame Fn to the frame Fn+1), the bright band is shown in the upper side of the display panel because the common voltage corresponding to pixels of the first scan line of the display panel is influenced by polarity of the voltage of the datum outputted by the source driver.

SUMMARY OF THE INVENTION

An embodiment provides a method capable of improving frame quality. The method includes generating at least one control signal in a blanking time of a display panel according to polarity of a last datum before the blanking time of the display panel and polarity of a first datum after the blanking time; generating at least one datum synchronized with the at least one control signal in the blanking time according to the polarity of the last datum before the blanking time of the display panel, a voltage of the first datum after the blanking time, and the at least one control signal; generating a scan start signal; a last datum of the at least one datum is not changed after the at least one control signal.

Another embodiment provides a display capable of improving frame quality. The display includes a display panel, a timing controller, and a source driver. The timing controller is used for generating a scan start signal, and generating at least one control signal in a blanking time of the display panel according to polarity of a last datum before the blanking time and polarity of a first datum after the blanking time. The source driver is coupled to the timing controller for generating at least one datum synchronized with the at least one control signal according to the polarity of the last datum before the blanking time, a voltage of the first datum after the blanking time, and the at least one control signal, and generating data corresponding to an active time before the blanking time and after the scan start signal is generated, where the source driver does not change a last datum of the at least one datum after the at least one control signal.

The present invention provides a display capable of improving frame quality and a method capable of improving frame quality. The display and the method utilize a timing controller to generate at least one control signal in a blanking time of a display panel according to polarity of a last datum before the blanking time of the display panel and polarity of a first datum after the blanking time, and utilizes a source driver to generate at least one datum synchronized with the at least one control signal in the blanking time according to the polarity of the last datum before the blanking time of the display panel, a voltage of the first datum after the blanking time, and the at least one control signal. The source driver does not change a last datum of the at least one datum after the at least one control signal. Therefore, the present invention can utilize existing devices in the display to improve the frame quality of the display.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
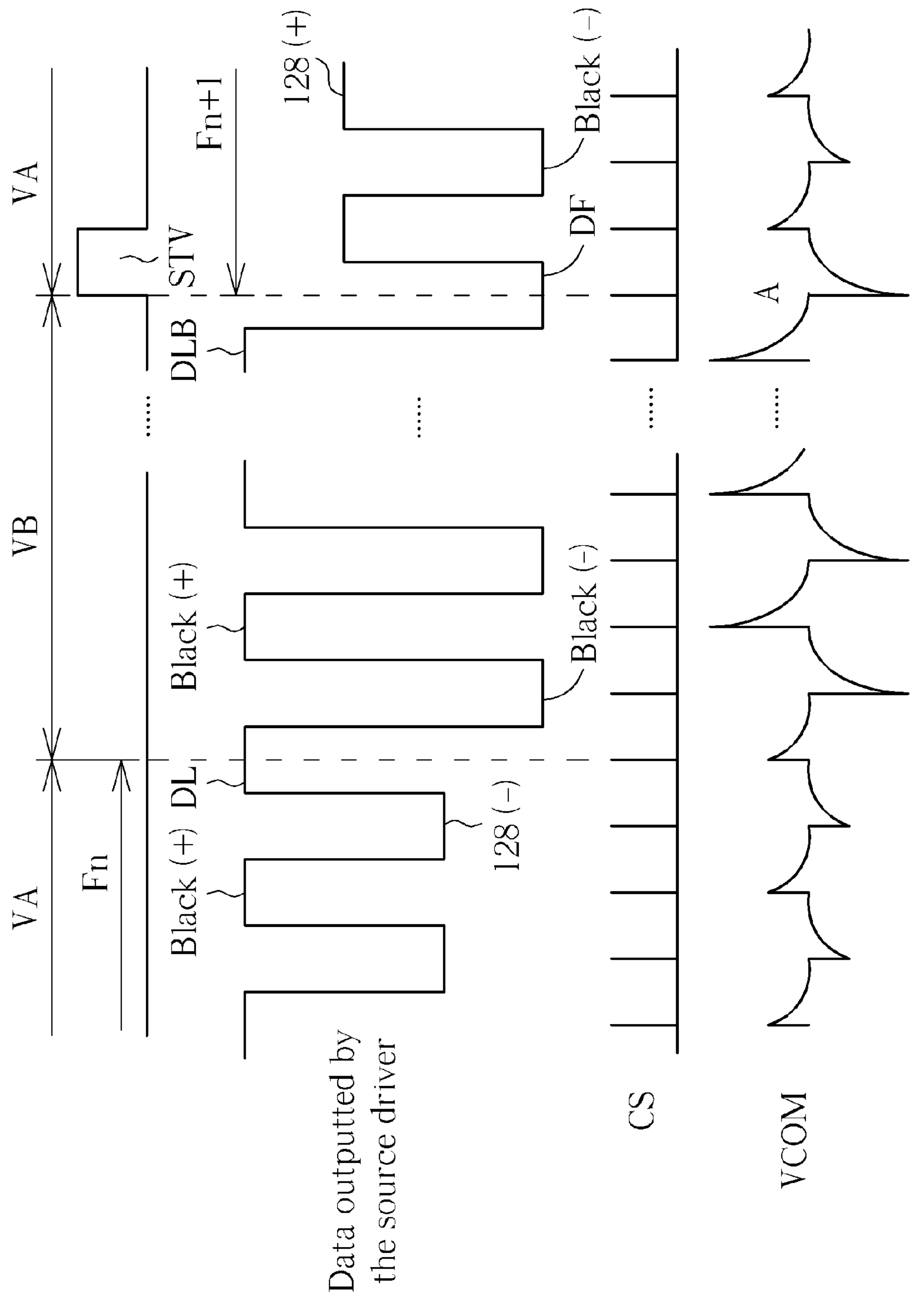
FIG. 1 PRIOR ART
FIG. 1 is a timing diagram illustrating an active time and a blanking time of a display panel, a scan start signal, data outputted by a source driver, control signals outputted by a timing controller, and a common voltage of the display panel according to the prior art.
Figure 2:
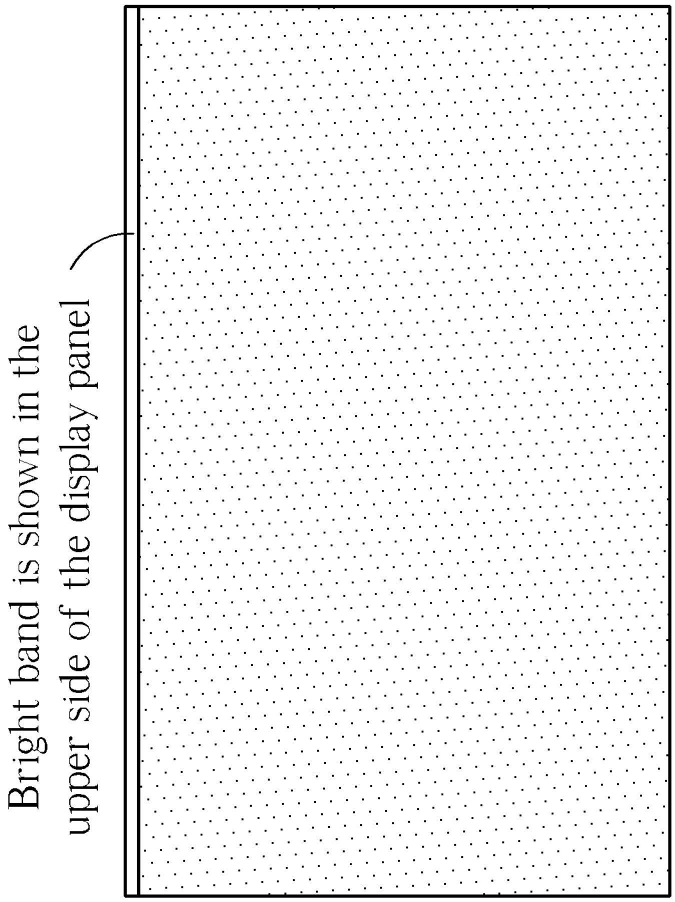
FIG. 2 PRIOR ART
FIG. 2 is a diagram illustrating a bright band being shown in an upper side of the display panel when the display panel refreshes data of a frame according to the prior art.
Figure 3:
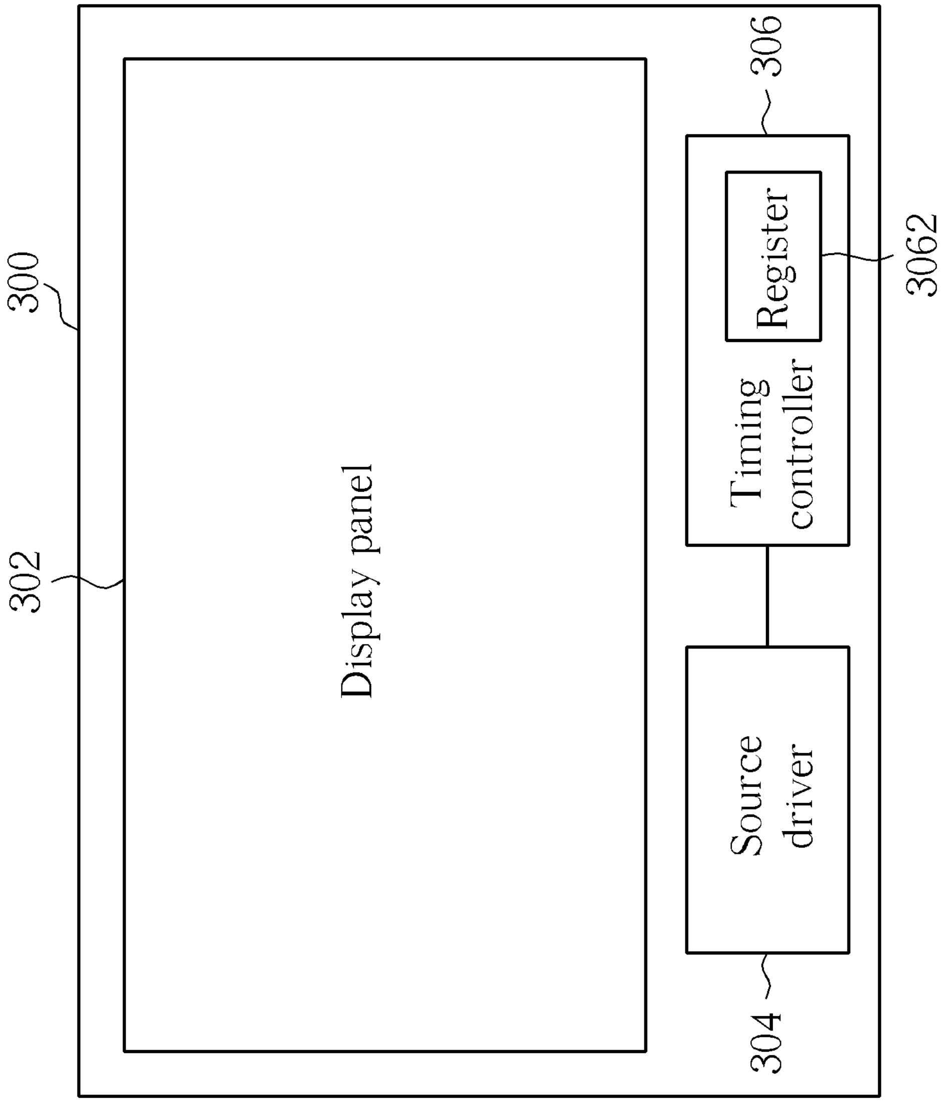
FIG. 3 is a diagram illustrating a display capable of improving frame quality according to an embodiment.
Figure 4:
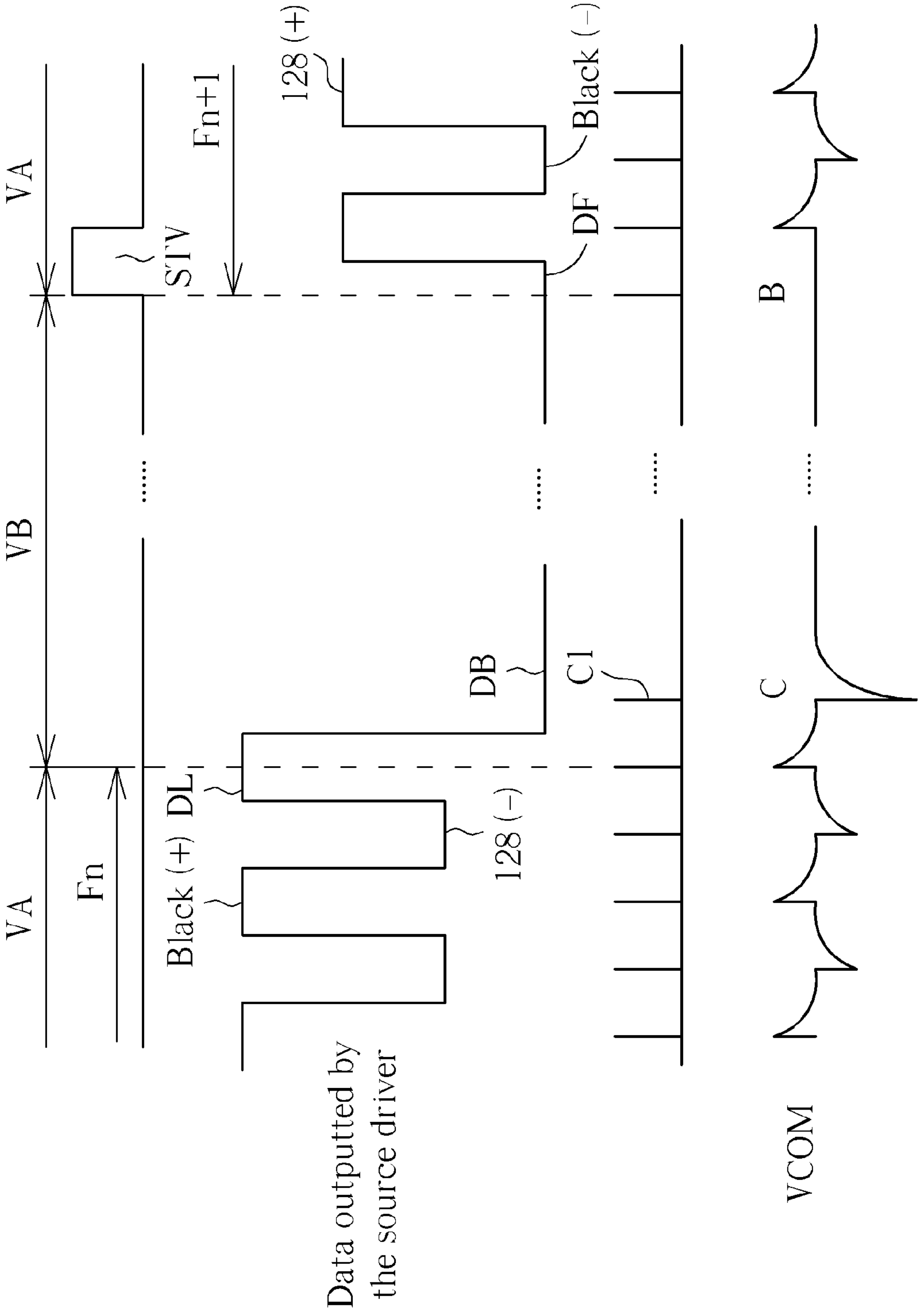
FIG. 4 is a timing diagram illustrating an active time and a blanking time of a display panel, a scan start signal, data outputted by a source driver, and a common voltage of the display panel according to a first embodiment.

Please refer to FIG. 3 and FIG. 4. FIG. 3 is a diagram illustrating a display 300 capable of improving frame quality according to an embodiment, and FIG. 4 is a timing diagram illustrating an active time VA and a blanking time VB of a display panel 302, a scan start signal STV, data outputted by a source driver 304, and a common voltage VCOM of the display panel 302 according to a first embodiment. As shown in FIG. 3, the display 300 includes the display panel 302, the source driver 304, and a timing controller 306. As shown in FIG. 3 and FIG. 4, the timing controller 306 is used for generating the scan start signal STV, and generating a control signal C1 in the blanking time VB according to polarity of a last datum DL (positive polarity) outputted by the source driver 304 before the blanking time VB of the display panel 302 (a frame Fn of the active time VA) and polarity of a first datum DF (negative polarity) outputted by the source driver 304 after the blanking time VB (a frame Fn+1 of the active time VA), where the blanking time VB is before the scan start signal STV is generated. But, the present invention is not limited to the timing controller 306 only generating one control signal C1 in the blanking time VB. That is to say, when polarity of a last datum outputted by the source driver 304 before the blanking time VB is different from polarity of a first datum outputted by the source driver 304 after the blanking time VB, number of control signals generated by the timing controller 306 is an odd value which is larger than/equal to 1. In addition, the timing controller 306 further includes a register 3062 for storing a voltage corresponding to black (+) according to a voltage of the first datum DF after the blanking time VB. The source driver 304 is coupled to the timing controller 306 for generating a datum DB in the blanking time VB according to the polarity of the last datum DL, the voltage corresponding to the black (+) stored in the register 3062, and the control signal C1, and the source driver 304 does not change the datum DB after the control signal C1. In addition, the source driver 304 can generate data corresponding to the active time VA (that is, data corresponding to the frame Fn and the frame Fn+1 of the active time VA) before the blanking time VB and after the scan start signal STV is generated. Therefore, the display panel 302 can display corresponding frames (the frame Fn and the frame Fn+1) according to the data corresponding to the active time VA generated by the source driver 304 before the blanking time VB and after the scan start signal STV is generated.

As shown in FIG. 4, a voltage of the last datum DL (the positive polarity) is the voltage corresponding to the black (+). Because the polarity of the last datum DL is different from the polarity of the first datum DF, the timing controller 306 generates one control signal C1 in the blanking time VB. The register 3062 stores the voltage corresponding to the black (+) according to the voltage of the first datum DF (a voltage corresponding to black (−)). But, the present invention is not limited to the voltage of the last datum DL being the voltage corresponding to the black (+), and the voltage of the first datum DF being the voltage corresponding to the black (−). In addition, the present invention is also not limited to the polarity of the last datum DL being the positive polarity and the polarity of the first datum DF being the negative polarity. Thus, in the blanking time VB, the source driver 304 can generate the datum DB after the last datum DL according to the polarity of the last datum DL, the control signal C1, and the voltage corresponding to the black (+) stored in the register 3062. Because the polarity of the last datum DL is the positive polarity, polarity of the datum DB is the negative polarity and a voltage of the datum DB is the voltage corresponding to the black (−). In addition, after the control signal C1, the source driver 304 does not change the datum DB because the timing controller 306 does not generate control signals until the frame Fn+1. Because the voltage of the datum DB is the same as the voltage of the first datum DF outputted by the source driver 304 after the blanking time VB, and the polarity of the datum DB is also the same as the polarity of the first datum DF outputted by the source driver 304 after the blanking time VB, the common voltage VCOM of the display panel 302 is not coupled down (a point B in FIG. 4). In addition, as shown by a point C, because voltages of output data of the source driver 304 are changed from the voltage corresponding to the black (+) (the voltage of the last datum DL) to the voltage corresponding to the black (−) (the voltage of the datum DB), the common voltage VCOM of the display panel 302 is coupled down. But, the point C is within the blanking time VB, so the frame quality of the display panel 302 is not influenced.

Figure 5:
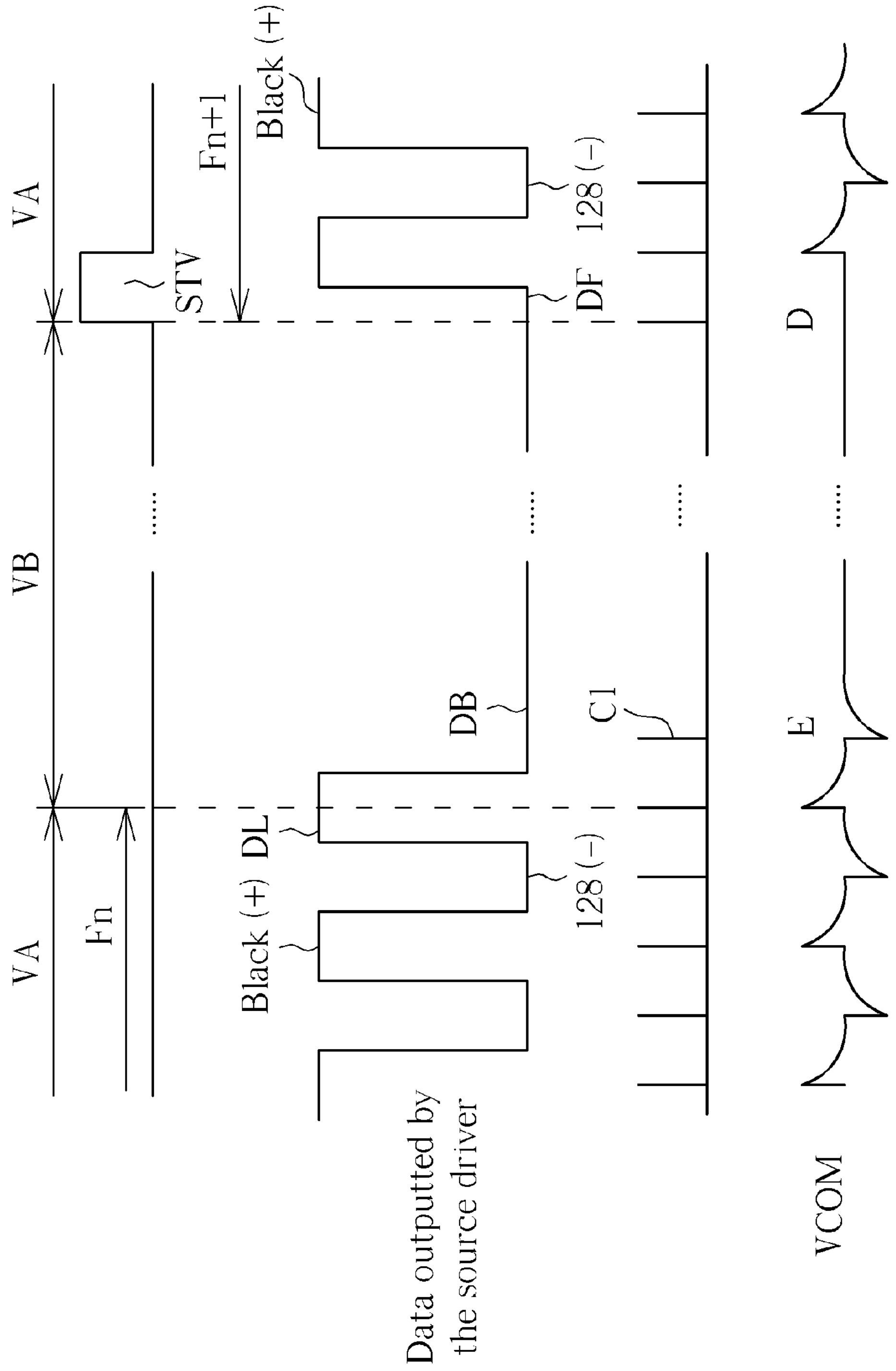
FIG. 5 is a timing diagram illustrating an active time and a blanking time of the display panel, a scan start signal, data outputted by the source driver, and a common voltage of the display panel according to a second embodiment.

Please refer to FIG. 3 and FIG. 5. FIG. 5 is a timing diagram illustrating an active time VA and a blanking time VB of the display panel 302, a scan start signal STV, data outputted by the source driver 304, and a common voltage VCOM of the display panel 302 according to a second embodiment. As shown in FIG. 3 and FIG. 5, the timing controller 306 generates the scan start signal STV, and generates a control signal C1 in the blanking time VB according to polarity of a last datum DL (the positive polarity) outputted by the source driver 304 before the blanking time VB of the display panel 302 (a frame Fn of the active time VA) and polarity of a first datum DF (the negative polarity) outputted by the source driver 304 after the blanking time VB (a frame Fn+1 of the active time VA). As shown in FIG. 5, a voltage of the last datum DL (the positive polarity) is the voltage corresponding to the black (+). Because the polarity of the last datum DL is different from the polarity of the first datum DF, the timing controller 306 generates one control signal C1 in the blanking time VB. The register 3062 stores a voltage corresponding to 128 (+) according to a voltage of the first datum DF (a voltage corresponding to 128 (−)). But, the present invention is not limited to the voltage of the last datum DL being the voltage corresponding to the black (+), and the voltage of the first datum DF being the voltage corresponding to the 128 (−). In addition, the present invention is not limited to the polarity of the datum DL being the positive polarity and the polarity of the first datum DF being the negative polarity. Thus, in the blanking time VB, the source driver 304 can generate a datum DB after the last datum DL according to the polarity of the last datum DL, the control signal C1, and the voltage corresponding to the 128 (+) stored in the register 3062. Because the polarity of the last datum DL is the positive polarity, polarity of the datum DB is the negative polarity and a voltage of the datum DB is the voltage corresponding to the 128 (−). In addition, after the control signal C1, the source driver 304 does not change the datum DB because the timing controller 306 does not generate control signals until the frame Fn+1. Because the voltage of the datum DB (the voltage corresponding to the 128 (−)) is the same as the voltage of the first datum DF outputted by the source driver 304 after the blanking time VB (the voltage corresponding to the 128 (−)), and the polarity of the datum DB is also the same as the polarity of the first datum DF outputted by the source driver 304 after the blanking time VB, the common voltage VCOM of the display panel 302 is not coupled down (a point D in FIG. 5). In addition, as shown by a point E, because voltages of output data of the source driver 304 are changed from the voltage corresponding to the black (+) (the voltage of the last datum DL) to the voltage corresponding to the 128 (−) (the voltage of the datum DB), the common voltage VCOM of the display panel 302 is coupled down. But, the point E is within the blanking time VB, so the frame quality of the display panel 302 is not influenced.

Figure 6:
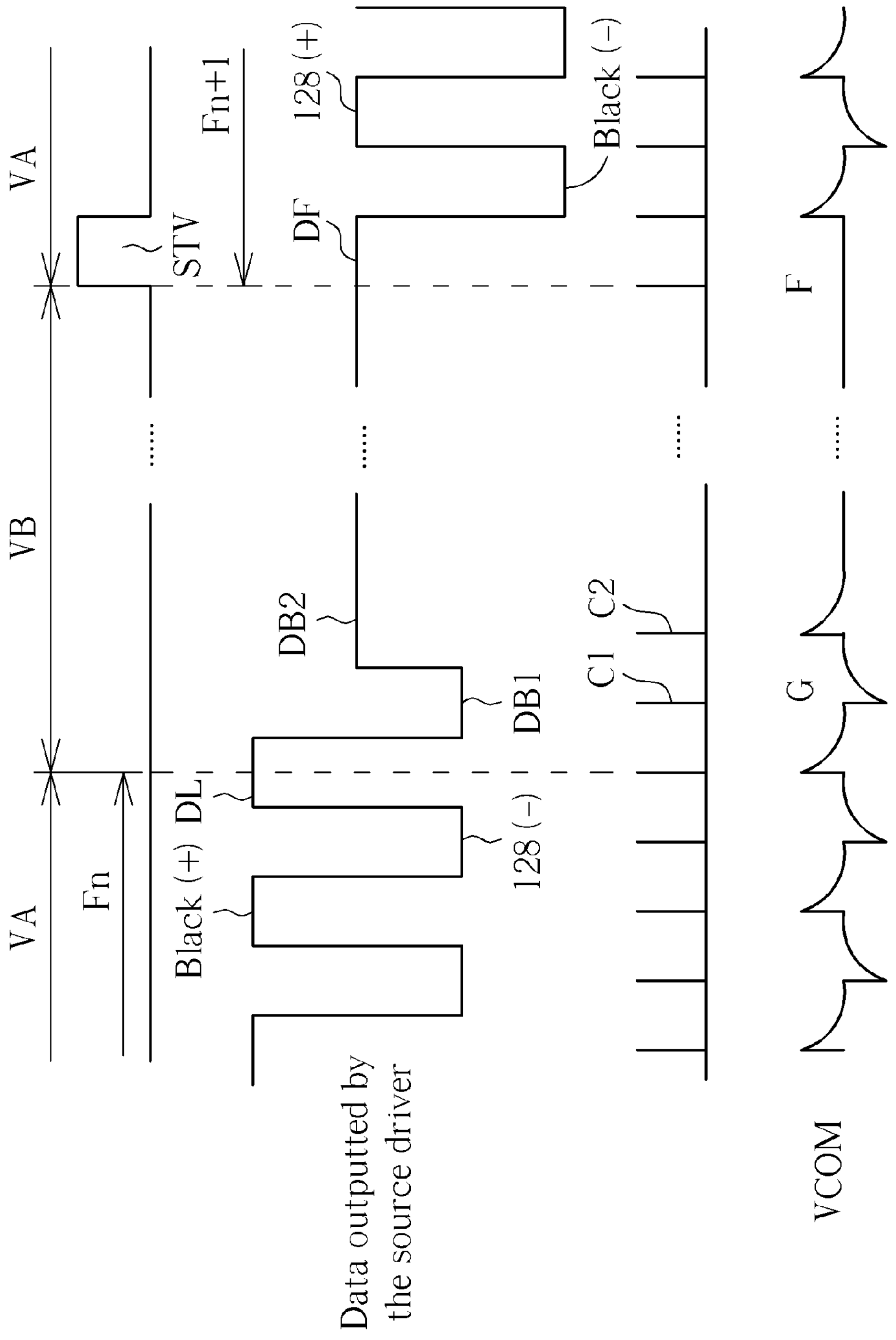
FIG. 6 is a timing diagram illustrating an active time and a blanking time of the display panel, a scan start signal, data outputted by the source driver, and a common voltage of the display panel according to a third embodiment.

Please refer to FIG. 3 and FIG. 6. FIG. 6 is a timing diagram illustrating an active time VA and a blanking time VB of the display panel 302, a scan start signal STV, data outputted by the source driver 304, and a common voltage VCOM of the display panel 302 according to a third embodiment. As shown in FIG. 3 and FIG. 6, the timing controller 306 generates the scan start signal STV, and generates two control signals C1, C2 in the blanking time VB according to polarity of a last datum DL (the positive polarity) outputted by the source driver 304 before the blanking time VB of the display panel 302 (a frame Fn of the active time VA) and polarity of a first datum DF (the positive polarity) outputted by the source driver 304 after the blanking time VB (a frame Fn+1 of the active time VA). But, the present invention is not limited to timing controller 306 generating the two control signals C1, C2 in the blanking time VB. That is to say, when polarity of a last datum outputted by the source driver 304 before the blanking time VB is the same as polarity of a first datum outputted by the source driver 304 after the blanking time VB, the number of control signals generated by the timing controller 306 is an even value which is larger than/equal to 2. As shown in FIG. 6, a voltage of the last datum DL (the positive polarity) is the voltage corresponding to the black (+). Because polarity of the last datum DL is the same as polarity of the first datum DF, the timing controller 306 generates the two control signals C1, C2 in the blanking time VB. The register 3062 stores the voltage corresponding to the 128 (+) according to a voltage of the first datum DF (the voltage corresponding to the 128 (+)). But, the present invention is not limited to the voltage of the last datum DL being the voltage corresponding to the black (+), and the voltage of the first datum DF being the voltage corresponding to the 128 (+). In addition, the present invention is not limited to the polarity of the last datum DL being the positive polarity and the polarity of the first datum DF also being the positive polarity. Thus, in the blanking time VB, the source driver 304 can generate a datum DB1 (the voltage corresponding to the 128 (−)) after the last datum DL according to the polarity of the last datum DL, the control signal C1, and the voltage corresponding to the 128 (+) stored in the register 3062, and generate a datum DB2 (the voltage corresponding to the 128 (+)) after the datum DB1 according to polarity of the datum DB1, the control signal C2, and a voltage of the datum DB1. Because the polarity of the last datum DL is the positive polarity, the polarity of the datum DB1 is the negative polarity and the voltage of the datum DB1 is the voltage corresponding to the 128 (−), and polarity of the datum DB2 is the positive polarity and a voltage of the datum DB2 is the voltage corresponding to the 128 (+). In addition, after the control signal C2, the source driver 304 does not change the datum DB2 because the timing controller 306 does not generate control signals until the frame Fn+1. Because the voltage of the datum DB2 (the voltage corresponding to the 128 (+)) is the same as the voltage of the first datum DF (the voltage corresponding to the 128 (+)) outputted by the source driver 304 after the blanking time VB, and the polarity of the datum DB2 is the also same as the polarity of the first datum DF outputted by the source driver 304 after the blanking time VB, the common voltage VCOM of the display panel 302 is not coupled down (a point F in FIG. 6). In addition, as shown by a point G, because voltages of output data of the source driver 304 are changed from the voltage corresponding to the black (+) (the voltage of the last datum DL) to the voltage corresponding to the 128 (−) (the voltage of the datum DB1), the common voltage VCOM of the display panel 302 is coupled down. But, the point G is within the blanking time VB, so the frame quality of the display panel 302 is not influenced.

Figure 7:
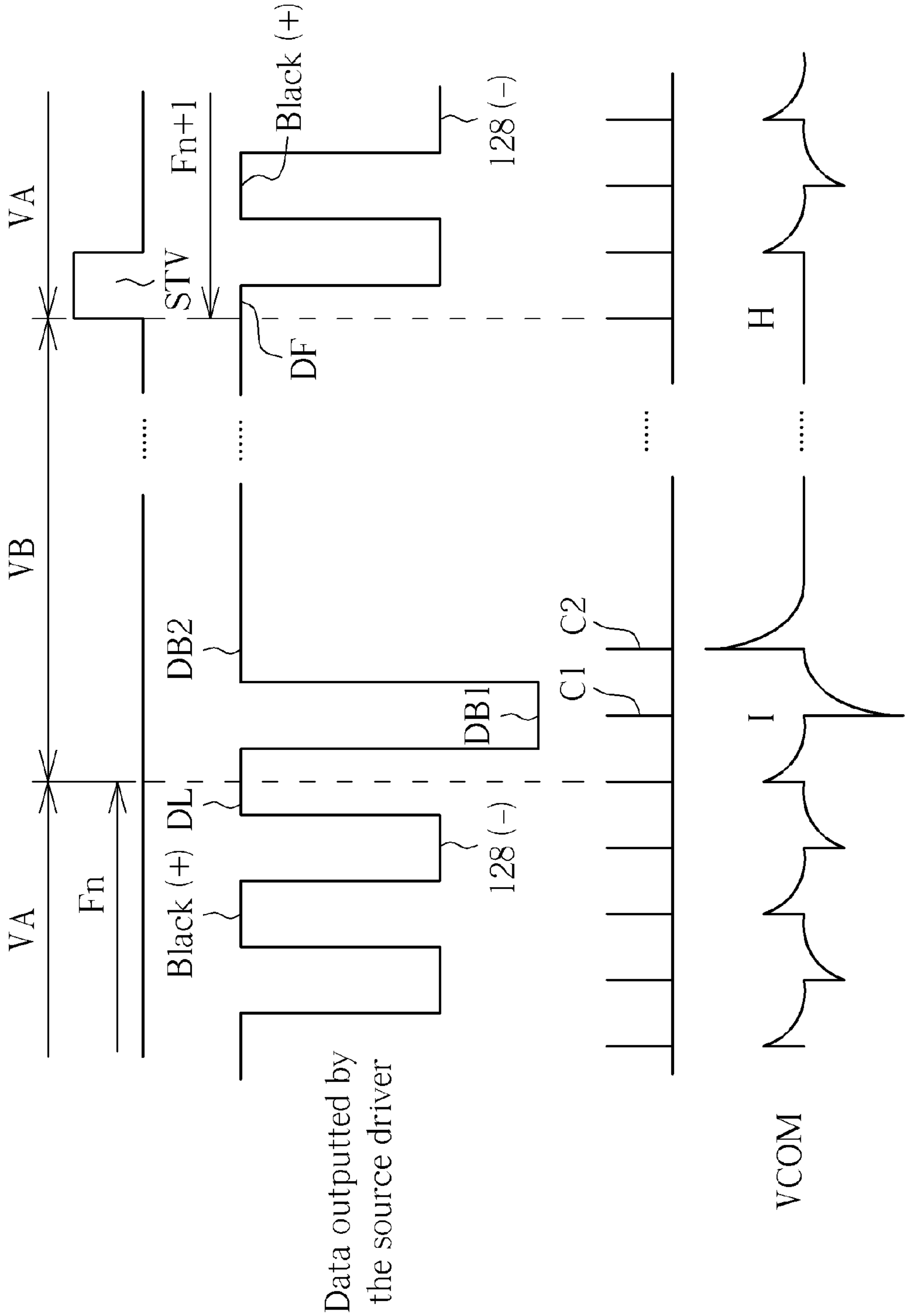
FIG. 7 is a timing diagram illustrating an active time and a blanking time of the display panel, a scan start signal, data outputted by the source driver, and a common voltage of the display panel according to a fourth embodiment.

Please refer to FIG. 3 and FIG. 7. FIG. 7 is a timing diagram illustrating an active time VA and a blanking time VB of the display panel 302, a scan start signal STV, data outputted by the source driver 304, and a common voltage VCOM of the display panel 302 according to a fourth embodiment. As shown in FIG. 3 and FIG. 7, the timing controller 306 generates the scan start signal STV, and generates two control signals C1, C2 in the blanking time VB according to polarity of a last datum DL (the positive polarity) outputted by the source driver 304 before the blanking time VB of the display panel 302 (a frame Fn of the active time VA) and polarity of a first datum DF (the positive polarity) outputted by the source driver 304 after the blanking time VB (a frame Fn+1 of the active time VA). But, the present invention is not limited to the timing controller 306 generating the two control signals C1, C2 in the blanking time VB. As shown in FIG. 7, a voltage of the last datum DL (the positive polarity) is the voltage corresponding to the black (+). Because the polarity of the last datum DL is the same as the polarity of the first datum DF, the timing controller 306 generates the two control signals C1, C2 in the blanking time VB. The register 3062 stores the voltage corresponding to the black (+) according to a voltage of the first datum DF (the voltage corresponding to the black (+)). But, the present invention is not limited to the voltage of the last datum DL being the voltage corresponding to the black (+), and the voltage of the first datum DF being the voltage corresponding to the black (+). In addition, the present invention is not limited to the polarity of the last datum DL being the positive polarity and the polarity of the first datum DF also being the positive polarity. Thus, in the blanking time VB, the source driver 304 can generate a datum DB1 (the voltage corresponding to the black (−)) after the last datum DL according to the polarity of the last datum DL, the control signal C1, and the voltage corresponding to the black (+) stored in the register 3062, and generate a datum DB2 (the voltage corresponding to the black (+)) after the datum DB1 according to polarity of the datum DB1, the control signal C2, and a voltage of the datum DB1. Because the polarity of the last datum DL is the positive polarity, the polarity of the datum DB1 is the negative polarity and the voltage of the datum DB1 is the voltage corresponding to the black (−), and polarity of the datum DB2 is the positive polarity and a voltage of the datum DB2 is the voltage corresponding to the black (+). In addition, after the control signal C2, the source driver 304 does not change the datum DB2 because the timing controller 306 does not generate control signals until the frame Fn+1. Because the voltage of the datum DB2 (the voltage corresponding to the black (+)) is the same as the voltage of the first datum DF (the voltage corresponding to the black (+)) outputted by the source driver 304 after the blanking time VB, and the polarity of the datum DB2 is the also the same as the polarity of the first datum DF outputted by the source driver 304 after the blanking time VB, the common voltage VCOM of the display panel 302 is not coupled down (a point H in FIG. 7). In addition, as shown by a point I, because voltages of output data of the source driver 304 are changed from the voltage corresponding to the black (+) (the voltage of the last datum DL) to the voltage corresponding to the black (−) (the voltage of the datum DB1), the common voltage VCOM of the display panel 302 is coupled down. But, the point I is within the blanking time VB so the frame quality of the display panel 302 is not influenced.

Figure 8:
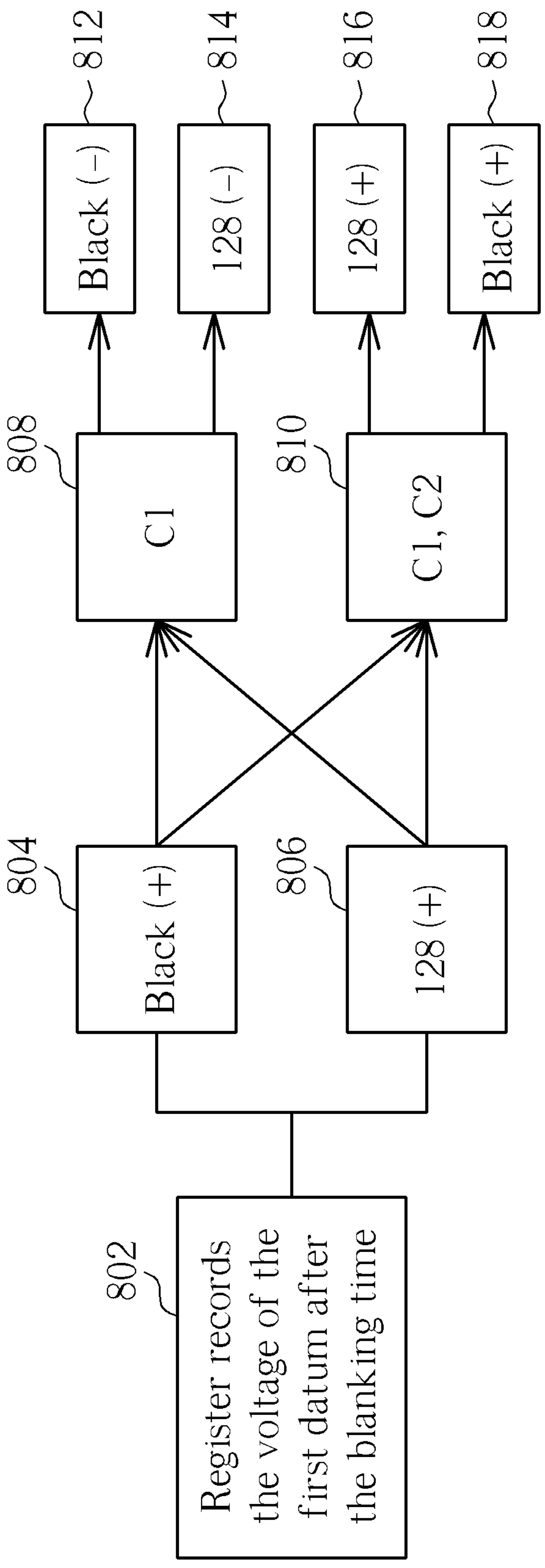
FIG. 8 is a flowchart illustrating operation of the register, the timing controller, and the source driver in the blanking time in the embodiments in FIG. 4, FIG. 5, FIG. 6, and FIG. 7.

Please refer to FIG. 4, FIG. 5, FIG. 6, FIG. 7, and FIG. 8. FIG. 8 is a flowchart illustrating operation of the register 3062, the timing controller 306, and the source driver 304 in the blanking time VB in the embodiments in FIG. 4, FIG. 5, FIG. 6, and FIG. 7. As shown in FIG. 8, in Step 802, the register 3062 records the voltage of the first datum DF after the blanking time VB. In Step 804, the register 3062 stores the voltage corresponding to the black (+) (the embodiments in FIG. 5 and FIG. 7) according to the voltage of the first datum DF. In Step 806, the register 3062 stores the voltage corresponding to the 128 (+) (the embodiments in FIG. 4 and FIG. 6) according to the voltage of the first datum DF. In Step 808, because the polarity of the last datum DL outputted by the source driver 304 before the blanking time VB is different from the polarity of the first datum DF outputted by the source driver 304 after the blanking time VB, the timing controller 306 generates one control signal C1 (the embodiments in FIG. 4 and FIG. 5). In Step 810, because the polarity of the last datum DL outputted by the source driver 304 before the blanking time VB is the same as the polarity of the first datum DF outputted by the source driver 304 after the blanking time VB, the timing controller 306 generates two control signals C1, C2 (the embodiments in FIG. 6 and FIG. 7). In Step 812, the source driver 304 generates the datum DB corresponding to the voltage of the black (−) after the last datum DL according to the control signal C1 and the voltage corresponding to the black (+) stored in the register 3062 (the embodiment in FIG. 4). In Step 814, the source driver 304 generates the datum DB corresponding to the voltage of the 128 (−) after the last datum DL according to the control signal C1 and the voltage corresponding to the 128 (+) stored in the register 3062 (the embodiment in FIG. 5). In Step 816, the source driver 304 generates the datum DB1 corresponding to the voltage of the 128 (−) after the last datum DL according to the control signal C1 and the voltage corresponding to the 128 (+) stored in the register 3062, and generates the datum DB2 corresponding to the voltage of the 128 (+) after the datum DB1 according to the control signal C2 and the voltage of the datum DB1 (the embodiment in FIG. 6). In Step 818, the source driver 304 generates the datum DB1 corresponding to the voltage of the black (−) after the last datum DL according to the control signal C1 and the voltage corresponding to the black (+) stored in the register 3062, and generates the datum DB2 corresponding to the voltage of the black (+) after the datum DB1 according to the control signal C2 and the voltage of the datum DB1 (the embodiment in FIG. 7).

Figure 9:
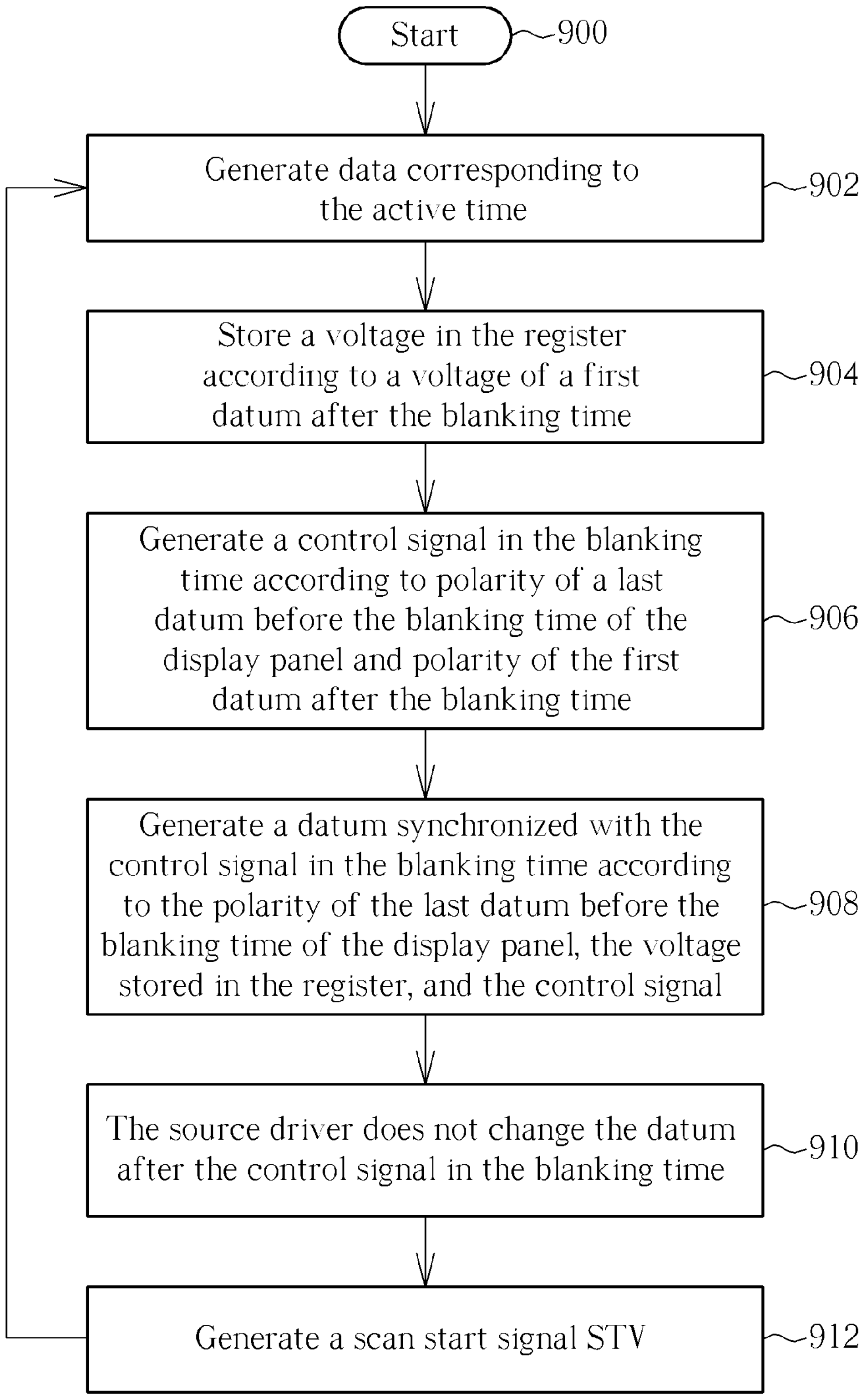
FIG. 9 is flowchart illustrating a method capable of improving frame quality according to a fifth embodiment.

Please refer to FIG. 3, FIG. 4, FIG. 5, and FIG. 9. FIG. 9 is flowchart illustrating a method capable of improving frame quality according to a fifth embodiment. The method in FIG. 9 is illustrated using the display 300 in FIG. 3. Detailed steps are as follows:

Step 900: Start.

Step 902: Generate data corresponding to the active time VA.

Step 904: Store a voltage in the register 3062 according to a voltage of a first datum DF after the blanking time VB.

Step 906: Generate a control signal C1 in the blanking time VB according to polarity of a last datum DL before the blanking time VB of the display panel 302 and polarity of the first datum DF after the blanking time VB.

Step 908: Generate a datum DB synchronized with the control signal C1 in the blanking time according to the polarity of the last datum DL before the blanking time VB of the display panel 302, the voltage stored in the register 3062, and the control signal C1.

Step 910: The source driver does not change the datum DB after the control signal C1 in the blanking time VB.

Step 912: Generate a scan start signal STV; go to Step 902.

In Step 902, the source driver 304 generates the data corresponding to the frame Fn of the active time VA before the blanking time VB. In Step 904, as shown in FIG. 4, the register 3062 stores the voltage corresponding to the black (+) according to the voltage of the first datum DF (the voltage corresponding to the black (−)); as shown in FIG. 5, the register 3062 stores the voltage corresponding to the 128 (+) according to the voltage of the first datum DF (the voltage corresponding to the 128 (−)). In Step 906, when the polarity of the last datum DL outputted by the source driver 304 before the blanking time VB is different from the polarity of the first datum DF outputted by the source driver 304 after the blanking time VB, number of control signals generated by the timing controller 306 is an odd value which is larger than/equal to 1. Therefore, as shown in FIG. 4 and FIG. 5, the polarity of the last datum DL outputted by the source driver 304 before the blanking time VB is different from the polarity of the first datum DF outputted by the source driver 304 after the blanking time VB, so the timing controller 306 generates the control signal C1. In Step 908, as shown in FIG. 4, the source driver 304 generates the datum DB according to the polarity of the last datum DL before the blanking time VB of the display panel 302, the voltage corresponding to the black (+) stored in the register 3062 (the register 3062 stores the voltage corresponding to the black (+) according to the voltage of the first datum DF), and the control signal C1. Because the polarity of the last datum DL is the positive polarity, polarity of the datum DB is the negative polarity and a voltage of the datum DB is the voltage corresponding to the black (−). As shown in FIG. 5, the source driver 304 generates the datum DB according to the polarity of the last datum DL before the blanking time VB of the display panel 302, the voltage corresponding to the 128 (+) stored in the register 3062 (the register 3062 stores the voltage corresponding to the 128 (+) according to the voltage of the first datum DF), and the control signal C1. Because the polarity of the last datum DL is the positive polarity, polarity of the datum DB is the negative polarity and a voltage of the datum DB is the voltage corresponding to the 128 (−). In Step 910, as shown in FIG. 4 and FIG. 5, the source driver 304 does not change the datum DB because the timing controller 306 does not generate control signals until the frame Fn+1 after the control signal C1. As shown in FIG. 4 and FIG. 5, because the voltage of the datum DB is the same as the voltage of the first datum DF outputted by the source driver 304 after the blanking time VB, and the polarity of the datum DB is also the same as the polarity of the first datum DF outputted by the source driver 304 after the blanking time VB, the common voltage VCOM of the display panel 302 is not coupled down (the point B in FIG. 4 and the point D in FIG. 5). In Step 912, the timing controller 306 generates the scan start signal STV, where the blanking time VB is before the scan start signal STV is generated. The source driver 304 generates the data corresponding to the frame Fn+1 of the active time VA after the scan start signal STV is generated.

Figure 10:
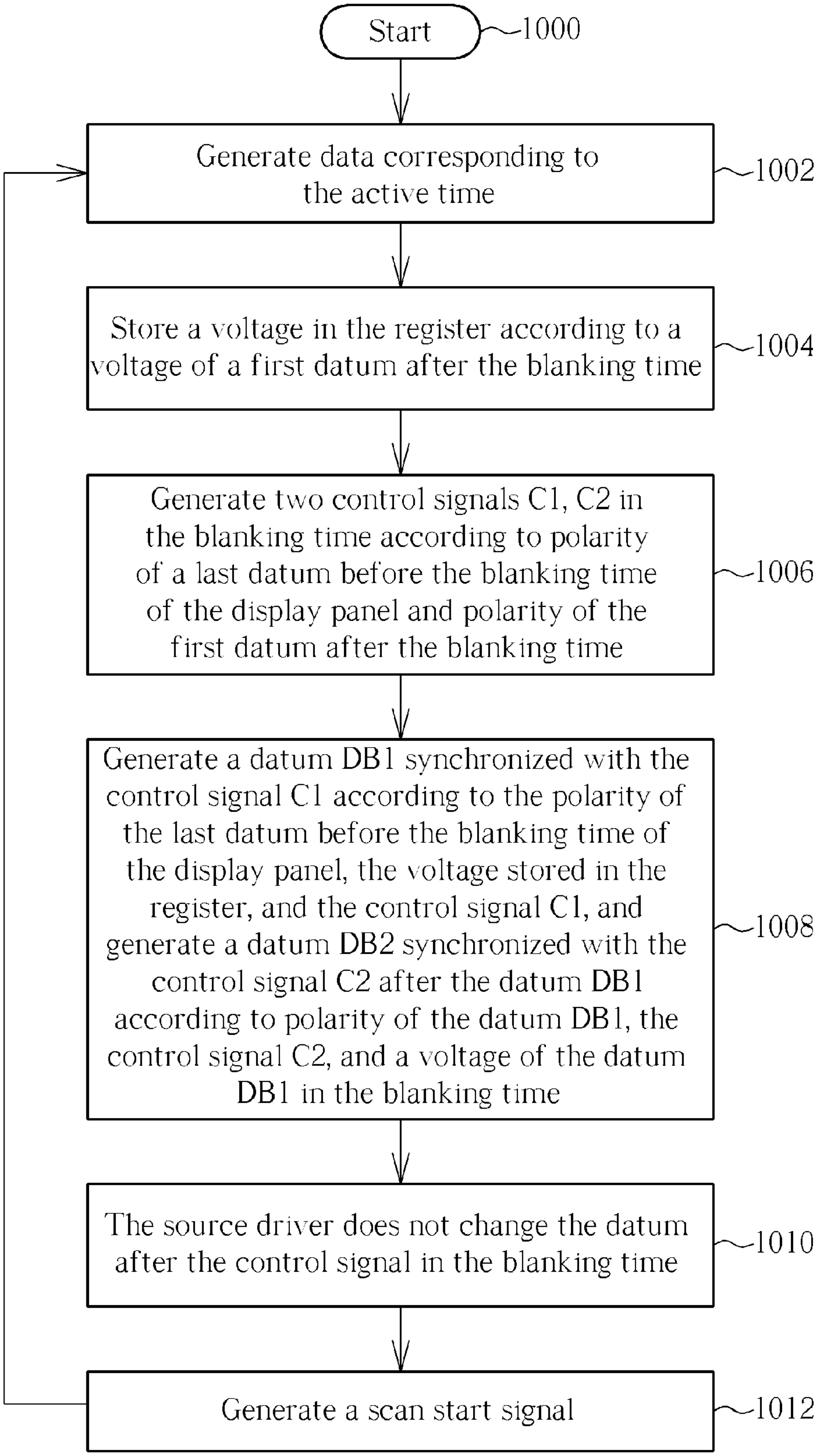
FIG. 10 is flowchart illustrating a method capable of improving frame quality according to a sixth embodiment.

Please refer to FIG. 3, FIG. 6, FIG. 7, and FIG. 10. FIG. 10 is a flowchart illustrating a method capable of improving frame quality according to a sixth embodiment. The method in FIG. 10 is illustrated using the display 300 in FIG. 3. Detailed steps are as follows:

Step 1000: Start.

Step 1002: Generate data corresponding to the active time VA.

Step 1004: Store a voltage in the register 3062 according to a voltage of a first datum DF after the blanking time VB.

Step 1006: Generate two control signals C1, C2 in the blanking time VB according to polarity of a last datum DL before the blanking time VB of the display panel 302 and polarity of the first datum DF after the blanking time VB.

Step 1008: Generate a datum DB1 synchronized with the control signal C1 according to the polarity of the last datum DL before the blanking time VB of the display panel 302, the voltage stored in the register 3062, and the control signal C1, and generate a datum DB2 synchronized with the control signal C2 after the datum DB1 according to polarity of the datum DB1, the control signal C2, and a voltage of the datum DB1 in the blanking time.

Step 1010: The source driver does not change the datum DB2 after the control signal C2 in the blanking time VB.

Step 1012: Generate a scan start signal STV; go to Step 1002.

In Step 1002, the source driver 304 generates the data corresponding to the frame Fn of the active time VA before the blanking time VB. In Step 1004, as shown in FIG. 6, the register 3062 stores the voltage corresponding to the 128 (+) according to the voltage of the first datum DF (the voltage corresponding to the 128 (+)); as shown in FIG. 7, the register 3062 stores the voltage corresponding to the black (+) according to voltage of the first datum DF (the voltage corresponding to the black (+)). In Step 1006, when the polarity of the last datum DL outputted by the source driver 304 before the blanking time VB is the same as the polarity of the first datum DF outputted by the source driver 304 after the blanking time VB, number of control signals generated by the timing controller 306 is an even value which is larger than/equal to 2. Therefore, as shown in FIG. 6 and FIG. 7, the polarity of the last datum DL outputted by the source driver 304 before the blanking time VB is the same as the polarity of the first datum DF outputted by the source driver 304 after the blanking time VB, so the timing controller 306 generates the two control signals C1, C2. In Step 1008, as shown in FIG. 6, the source driver 304 generates the datum DB1 according to the polarity of the last datum DL before the blanking time VB of the display panel 302, the voltage corresponding to the 128 (+) stored in the register 3062 (the register 3062 stores the voltage corresponding to the 128 (+) according to the voltage of the first datum DF), and the control signal C1, and generates the datum DB2 after the datum DB1 (the voltage corresponding to the 128 (+)) according to the polarity of the datum DB1, the control signal C2, and the voltage of the datum DB1. As shown in FIG. 6, because the polarity of the last datum DL is the positive polarity, the polarity of the datum DB1 is the negative polarity and the voltage of the datum DB1 is the voltage corresponding to the 128 (−), and polarity of the datum DB2 is the positive polarity and a voltage of the datum DB2 is the voltage corresponding to the 128 (+). As shown in FIG. 7, the source driver 304 generates the datum DB1 according to the polarity of the last datum DL before the blanking time VB of the display panel 302, the voltage corresponding to the black (+) stored in the register 3062 (the register 3062 stores the voltage corresponding to the black (+) according to the voltage of the first datum DF), and the control signal C1, and generates the datum DB2 after the datum DB1 (the voltage corresponding to the black (+)) according to polarity of the datum DB1, the control signal C2, and the voltage of the datum DB1. As shown in FIG. 7, because the polarity of the last datum DL is the positive polarity, the polarity of the datum DB1 is the negative polarity and the voltage of the datum DB1 is the voltage corresponding to the black (−), and polarity of the datum DB2 is the positive polarity and a voltage of the datum DB2 is the voltage corresponding to the black (+). In Step 1010, as shown in FIG. 6 and FIG. 7, the source driver 304 does not change the datum DB2 because the timing controller 306 does not generate control signals until the frame Fn+1 after the control signal C2. As shown in FIG. 6 and FIG. 7, because the voltage of the datum DB2 is the same as the voltage of the first datum DF outputted by the source driver 304 after the blanking time VB, and the polarity of the datum DB2 is also the same as the polarity of the first datum DF outputted by the source driver 304 after the blanking time VB, the common voltage VCOM of the display panel 302 is not coupled down (the point F in FIG. 6 and the point H in FIG. 7). In Step 1012, the timing controller 306 generates the scan start signal STV, where the blanking time VB is before the scan start signal STV is generated. The source driver 304 generates the data corresponding to the frame Fn+1 of the active time VA after the scan start signal STV is generated.

To sum up, the display capable of improving the frame quality and the method capable of improving the frame quality utilize the timing controller to generate at least one control signal in the blanking time of the display panel according to polarity of a last datum before the blanking time of the display panel and polarity of a first datum after the blanking time, and utilizes the source driver to generate at least one datum synchronized with the at least one control signal in the blanking time according to the polarity of the last datum before the blanking time of the display panel, a voltage of the first datum after the blanking time, and the at least one control signal. The source driver does not change a last datum of the at least one datum after the at least one control signal. Therefore, the present invention can utilize existing devices in the display to improve the frame quality of the display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method capable of improving frame quality, the method comprising:

generating at least one control signal in a blanking time of a display panel according to polarity of a last datum before the blanking time of the display panel and polarity of a first datum after the blanking time, wherein number of the at least one control signal is an even number when the polarity of the last datum before the blanking time is the same as the polarity of the first datum after the blanking time;

generating at least one datum synchronized with the at least one control signal in the blanking time according to the polarity of the last datum before the blanking time of the display panel, a voltage of the first datum after the blanking time, and the at least one control signal; and generating a scan start signal;

wherein a last datum of the at least one datum is not changed after the at least one control signal.

2. The method of claim 1, wherein a voltage of the last datum of the at least one datum is the same as the voltage of the first datum after the blanking time.

3. The method of claim 1, wherein polarity of the last datum of the at least one datum is the same as the polarity of the first datum after the blanking time.

4. The method of claim 1, wherein the blanking time of the display panel is before the scan start signal is generated.

5. The method of claim 1, wherein an active time of the display panel is before the blanking time and after the scan start signal is generated.

6. The method of claim 5, further comprising:

generating data corresponding to the active time before the blanking time and after the scan start signal is generated.

7. The method of claim 1, further comprising:

storing a voltage in a register according to the voltage of the first datum after the blanking time.

8. The method of claim 7, wherein generating the at least one datum synchronized with the at least one control signal according to the polarity of the last datum before the blanking time of the display panel, the voltage of the first datum after the blanking time, and the at least one control signal is generating the at least one datum synchronized with the at least one control signal according to the polarity of the last datum before the blanking time of the display panel, the voltage stored in the register and the at least one control signal.

9. A display capable of improving frame quality, the display comprising:

a display panel;

a timing controller for generating a scan start signal, and generating at least one control signal in a blanking time of the display panel according to polarity of a last datum before the blanking time and polarity of a first datum after the blanking time, wherein number of the at least one control signal is an even number if the polarity of the last datum before the blanking time is the same as the polarity of the first datum after the blanking time; and a source driver coupled to the timing controller for generating at least one datum synchronized with the at least one control signal according to the polarity of the last datum before the blanking time, a voltage of the first datum after the blanking time, and the at least one control signal, and generating data corresponding to an active time before the blanking time and after the scan start signal is generated;

wherein the source driver does not change a last datum of the at least one datum after the at least one control signal.

10. The display of claim 9, wherein a voltage of the last datum of the at least one datum is the same as the voltage of the first datum after the blanking time.

11. The display of claim 9, wherein polarity of the last datum of the at least one datum is the same as the polarity of the first datum after the blanking time.

12. The display of claim 9, wherein the blanking time of the display panel is before the scan start signal is generated.

13. The display of claim 9, wherein the active time of the display panel is before the blanking time and after the scan start signal is generated.

14. The display of claim 9, wherein the timing controller further comprises:

a register for storing a voltage according to the voltage of the first datum after the blanking time.

* * * * *